UNITED STATES PATENT OFFICE.

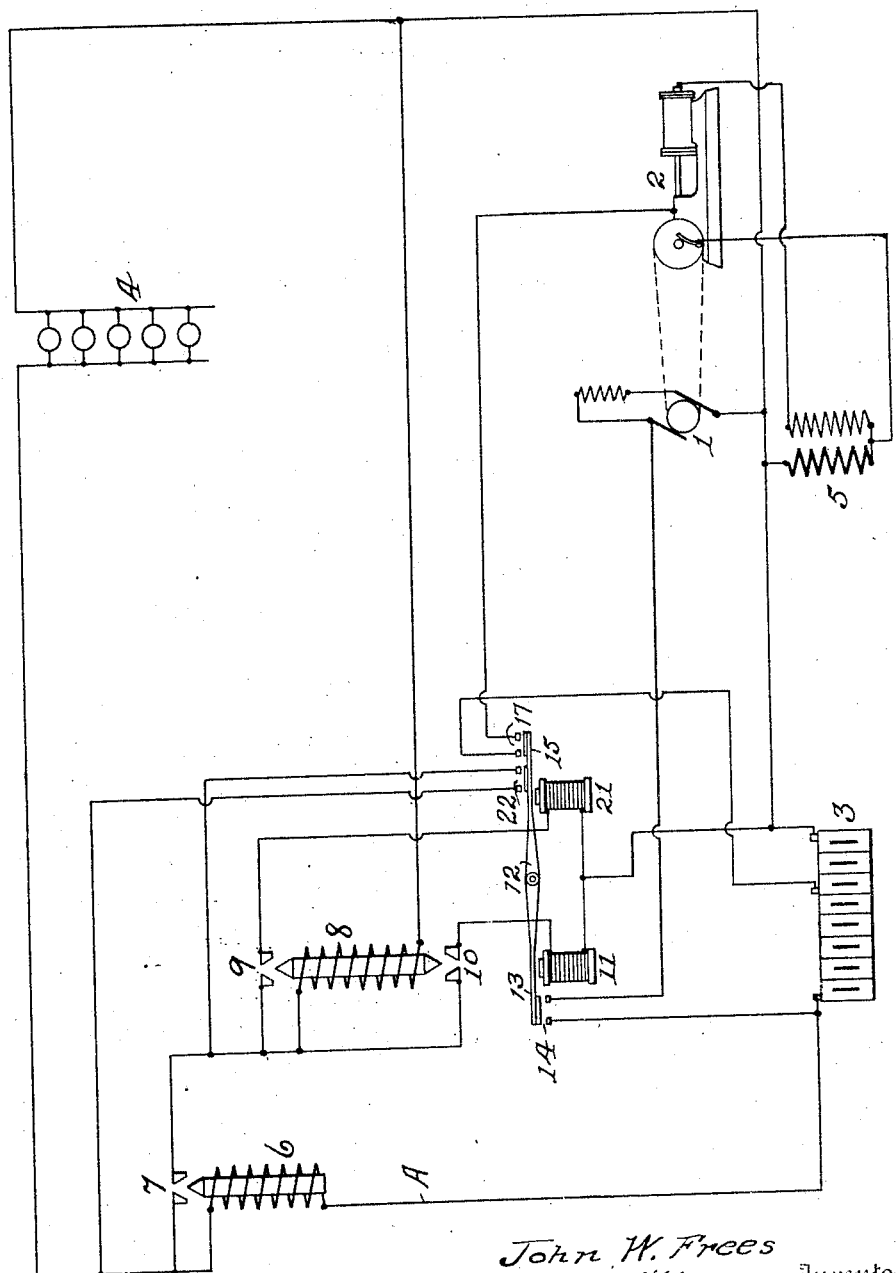
J. W. FREES & L. WINTER.
AUTOMATIC ELECTRIC LIGHTING SYSTEM.
APPLICATION FILED MAY 2, 1910.
994,145.
Patented June 6, 1911.

JOHN W. FREES AND LOUIS WINTER, OF READING, PENNSYLVANIA.

AUTOMATIC ELECTRIC-LIGHTING SYSTEM.

994,145.

Specification of Letters Patent.

Patented June 6, 1911.

Application filed May 2, 1910. Serial No. 558,750.

*To all whom it may concern:*

Be it known that we, JOHN W. FREES and LOUIS WINTER, citizens of the United States, residing at Reading, in the county of Berks and State of Pennsylvania, have invented certain new and useful Improvements in Automatic Electric-Lighting Systems, of which the following is a specification.

This invention relates to improvements in automatic electric lighting systems and our object is to provide a system in which the battery is automatically charged when its condition requires a charge and the current is being used; one in which the engine is started only when current is being used and one in which, when current is not being used, the battery is disconnected from all other units in the system.

The arrangement is such that the turning on of lights or the use of current for any purpose, will, if the battery requires a charge, immediately start the engine and generator to charge the battery, and when the use of current ceases, the battery is disconnected from the system provided the battery has attained its maximum charge. If, however, when the use of current ceases, the battery is not fully charged, it will continue to operate until such full charge has been attained when it will automatically stop the engine and generator, in other words, a system in which the use of current causes an instrument to close a circuit by which the system is placed in position to operate as an automatic electric lighting plant.

The invention is more fully described in the following specification and clearly illustrated in the accompanying drawing which shows a diagram of our system.

The numeral 1 designates the generator which is shown as a shunt wound instrument; 2 designates the engine; 3 the storage battery and 4 the lights; 5 is the ignition coil.

On the light circuit A we place a device, in the form of a solenoid 6 comprising a coil and a movable core, or its equivalent. When the lights are turned on this device is energized and the core moves up and contacts with the points 7, closing the circuit. This action will bring a high resistance solenoid 8 which is in circuit therewith, across the terminals of the battery. This instrument 8 thus brought into circuit will permit closing either contact 9 or 10 by the core moving up or down, depending on the voltage of the battery.

When the core is in lower position, indicating low voltage, and closing contact 10, it will energize a magnet 11. This energizing of magnet 11 will cause the lever 12 to be drawn toward it at the one end, 13, which end is provided with contacts 14 adapted to close the circuit between the battery and the generator and cause the generator to operate as a motor, and, being connected with the engine, start the movement of the engine. When the lever 12 is drawn down, as just described, the opposite end 15 will close the ignition circuit 17, leading to the engine and produce the initial explosion. When the engine has attained normal speed it will operate the instrument 1 as a generator and through it charge the battery. When the battery is fully charged, the core in the solenoid 8 will contact at 9 thus energizing the opposite magnet 21 and drawing the lever 12 away from contacts 14 and 17 and the engine and generator will stop.

When the lever 12 is moved to close the circuits as first above described, the end 15 will, in addition to closing contact 17, also close auxiliary contacts 22, in parallel with the contact 7. This circuit is closed whenever the generator is in operation so that in case contact 7 is broken, by reason of the fact that no current is being used, the instrument 8 will remain in circuit in order to permit magnet 21 to be energized by contact 9, at maximum voltage, through which all connection to the battery is broken.

It is evident that when the lights are turned on and the battery needs a charge, the system is at once automatically started and the battery charged. If when the lights are turned on the battery does not need a charge, it will not start the system,— but, the starting of the system is at all times dependent on the use of current. When no current is being used the battery is disconnected from the entire system.

We are aware that automatic electric lighting systems have been devised in which the starting and stopping of the engine has been accomplished through means responsive to the condition of the charge of the battery, and we do not desire to claim such as our invention, but What we do claim and desire to secure by Letters Patent is:

In an automatic electric generating system, the combination of an explosive engine; an electric generator; a storage battery; a discharge circuit; magnetic means in the discharge circuit adapted to operate by any discharge from the battery; additional circuits capable of being closed by the operation of said magnetic means, which circuits control the stopping of the system whenever a predetermined high voltage point is reached and the starting of the system when a predetermined low voltage point is reached only while current is being used.

In testimony whereof we affix our signatures, in presence of two witnesses.

JOHN W. FREES.
LOUIS WINTER.

Witnesses:
LUKE A. HUYETT,
ED. A. KELLY.